3,021,319
POLYMERIZATION OF ETHYLENE WITH ALKYL TITANIUM HALIDE CATALYSTS
Edward H. de Butts and Albert S. Matlack, Wilmington, Del., assignors to Hercules Powder Company, Wilmington, Del., a corporation of Delaware
No Drawing. Filed Nov. 30, 1956, Ser. No. 625,243
3 Claims. (Cl. 260—94.9)

This invention relates to an improved process for polymerizing ethylene whereby it is possible to carry out the polymerization under relatively mild conditions of pressure and temperature and obtain a polyethylene having very desirable properties.

K. Ziegler has described a process for polymerizing ethylene to a high molecular weight polyethylene under relatively mild conditions of temperaure and pressure by using as the catalyst for the polymerization a mixture of a salt of a metal of groups IV–B, V–B, VI–B or VIII of the periodic table or of manganese in combination with an organometallic compound of an alkali metal, alkaline earth metal, zinc, earth metal (especially aluminum), or rare earth metal. The process is usually carried out by mixing the two catalyst components in a hydrocarbon diluent and then passing the ethylene into the catalyst mixture at atmospheric or slightly elevated pressure and at room temperature or moderately elevated temperatures.

Now, in accordance with this invention, it has been found that ethylene may be polymerized to a high molecular weight polymer under equally mild conditions of temperature and pressure by means of a single catalytic agent, namely, an alkyltitanium halide. It was most surprising to discover that a titanium compound in its higher valent form could be used as the sole catalyst for the polymerization of ethylene. According to the process of this invention, ethylene is contacted with an alkyltitanium halide at ordinary pressure and moderate temperatures, preferably in the presence of a diluent.

The use of alkyltitanium halides as catalysts for the polymerization of ethylene in accordance with this invention has many advantages. Of particular value is the fact that these catalysts are soluble in the diluent generally used for carrying out the polymerization and, hence, are much more easily handled than in the case of the insoluble type of catalysts which must be added as suspensions, etc. Because of the solubility of the catalyst in the reaction diluent, it is generally then more easily removed from the polymer. Of even greater importance is the fact that the alkyltitanium halides yield much more polymer per unit of titanium; hence, much less catalyst is required for the polymerization and, consequently, there is less catalyst to remove from the polymer. These alkyltitanium halides are also advantageous catalysts from the standpoint that they are relatively stable compounds and may be stored for an indefinite period of time and, when used, do not require an organometallic compound or other activator of that type to reactivate them as in the case of the prior art catalysts mentioned above.

An even more significant advantage in the use of alkyltitanium halides as the catalysts for the polymerization of ethylene in accordance with this invention is the control in the type of polymer that may be achieved by their use. It is possible to vary the molecular weight distribution from a relatively narrow distribution to a high or broad distribution, as desired. In fact, the ratio of weight average molecular weight of the polymer to the number average molecular weight (Mw/Mn) can be adjusted to vary from 4 or less to as high as 40, a breadth of range not possible with the prior art catalysts. Also, by varying the particular alkyltitanium used, or if more than one is used, the ratio of the two or more that are used, it is possible to produce a polyethylene of almost any desired viscosity. An outstanding advantage is that the polymer produced by means of these catalysts is much more linear, having a significantly lower methyl content, and is much less unsaturated, being almost devoid of trans and vinylidene unsaturation and having an appreciably lower vinyl content, than the polymers produced by the prior art catalysts. Hence, the polyethylenes obtained by the process of this invention have superior physical properties and a better resistance to oxidation. Many other advantages in the use of the alkyltitanium halides in accordance with this invention will be obvious and appreciated by those skilled in the art.

Any alkyltitanium halide may be used in the process of this invention and generally will have the formula $R_nTiX_{4-n}$ where R is any alkyl radical, as for example, a methyl, ethyl, propyl, isobutyl amyl, hexyl, 2-ethylhexyl, octyl, etc., radical, X is halogen, particularly chlorine, bromine or iodine, and n is one or two, i.e., alkyltitanium trihalides or dialkyltitanium dihalides. Exemplary of these alkyltitanium halides which may be used as the catalyst for the polymerization of ethylene in accordance with this invention are methyltitanium trichloride, ethyltitanium trichloride, propyltitanium trichloride, butyltitanium trichloride, isobutyltitanium trichloride, amyltitanium trichloride, 2-ethylhexyltitanium trichloride, dimethyltitanium dichloride, diisobutyltitanium dichloride and the corresponding alkyltitanium tribromides, and iodides and dialkyltitanium dibromides, and iodides, etc. Mixtures of these alkyltitanium halides may also be used advantageously.

The polymerization of ethylene using the process of this invention may be carried out in a wide variety of ways, as for example, either as a batch or continuous operation. In general, the polymerization is carried out in the presence of a diluent. Any inert liquid organic solvent may be used as the diluent, as for example, aliphatic hydrocarbons such as hexane, heptane, etc., cycloaliphatic hydrocarbons such as cyclohexane, armoatic hydrocarbons such as benzene, toluene, etc., halogenated hydrocarbons such as carbon tetrachloride, chloroform, methylene chloride, etc., or any mixture of such diluents.

As was previously pointed out, the polymerization, in accordance with this invention, may be carried out under relatively mild conditions of temperature and pressure. The selection of the temperature and pressure will obviously depend upon such factors as the particular alkyltitanium halide being used as the catalyst, the degree of polymerization desired, etc. For example, the polymerization may be carried out at any temperature within the range of from about −50° C. to about 150° C. and preferably from about −20° C. to about 120° C., and more preferably from about 0° C. to about 60° C. In general, the most preferred temperature range when using an alkyltitanium trihalide is from about 30° C. to about 60° C. and when using a dialkyltitanium dihalide, a temperature range of from about 0° C. to about 30° C. is the most preferred. Usually the polymerization will be carried out at atmospheric pressure or at a pressure of only a few pounds. However, the polymerization may be carried out over a wide range of pressures from subatmospheric to high pressure, but high pressures do not appreciably alter the course of polymerization and, hence, are not generally used.

In carrying out the polymerization of ethylene with the alkyltitanium halides, the catalyst may be added all at one time at the beginning of the polymerization or it may be added in increments or continuously throughout the polymerization. The mode of addition that is used will to some degree depend upon the type of product desired. For example, generally speaking, by continuous addition of the alkyltitanium halide, a constant low concentration of catalyst is maintained in the system and, as a result, the product has a much narrower molecular weight distribution than where a higher catalyst concentration is used, as in the case where the catalyst is added all at one time at the beginning of the polymerization reaction. The alkyltitanium halide acts as a true catalyst and, hence, the amount added may be varied over a wide range from a minor catalytic amount up to an appreciable concentration of catalyst, again depending upon which of the alkyltitanium halides is used and on the type of product desired. In general, from about 0.1 to about 1000 millimoles per mole of ethylene will be used and in batch processes may be from about 0.1 millimole per liter of reaction mixture to about 100 millimoles per liter and preferably will be at least about 0.5 millimole per liter of reaction mixture.

The process of this invention may be modified in a wide variety of ways. In some cases it may be desirable to use a viscosity reducing agent such as hydrogen, but generally such as additional component for the polymerization reaction is not used since the viscosity of the product that is produced may be so readily controlled by selection of the alkyltitanium halide used as the catalyst. Thus, when methyltitanium trichloride is used as the catalyst, the polyethylene generally has a relatively low viscosity and higher viscosity products are obtained when isobutyltitanium trichloride is used as the catalyst. With dimethyltitanium dichloride even higher viscosity products are obtained, and with a combination of dimethyltitanium dichloride and methyltitanium trichloride it is possible to produce products having from very low viscosities to very high viscosities by varying the ratio of these two alkyltitanium halides. Obviously, many other variations may be made in the process of this invention.

The following examples will illustrate the process of polymerizing ethylene in accordance with this invention and some of the many modifications that may be made in the process. As will be seen from these examples, it is possible to select the proper conditions to prepare a polyethylene of almost any desired molecular weight. The molecular weight of the polymers produced is shown by the Reduced Specific Viscosity (RSV) given for each. By the term "Reduced Specific Viscosity" is meant the $\eta$ Sp./C. determined on a 0.1% solution of the polymer in decalin, containing 0.1 g. of the polymer per 100 ml. of solution at 135° C. Where the melting point of the polymer is given, it is the temperature at which the birefringence due to crystallinity disappears. All parts and percentages are by weight unless otherwise indicated.

The alkyltitanium halides used as the catalytic agents in accordance with this invention may be prepared in a variety of ways. A particularly effective method of preparing alkyltitanium trihalides is by the reaction of a titanium tetrahalide with a bis(cyclopentadienyl)titanium dialkyl, as for example, the reaction of titanium tetrachloride with bis(cyclopentadienyl)titanium dimethyl. They may also be prepared by the reaction of a titanium tetrahalide with a suitable metal alkyl compound such as a lithium alkyl or aluminum alkyl provided that the reaction is carried out at a temperature sufficiently low that the reduction of the titanium tetrahalide to titanium trihalide, which normally occurs at room temperature or above, does not take place. Generally, a temperature of below about 0° C. is required to form the alkyltitanium compound by this reaction, and preferably a temperature of about −30° C. to −60° C. or less is used. The dialkyltitanium dihalides are readily prepared by reacting an alkyltitanium trihalide with a bis(cyclopentadienyl)titanium dialkyl. Thus, dimethyltitanium dichloride is prepared by reacting methyltitanium trichloride with bis(cyclopentadienyl)titanium dimethyl. In general, the alkyltitanium halides are dark purple, crystalline solids which melt near or below room temperature to amber liquids. They are extremely sensitive to oxygen and water, and accordingly should be prepared under anaerobic and anhydrous conditions at as low a temperature as is practical. The preparations of methyltitanium trichloride and dimethyltitanium dichloride given below are typical examples of the preparation of the alkyltitanium halides used as catalysts in accordance with this invention.

PREPARATION OF METHYLTITANIUM TRICHLORIDE

Five parts of bis(cyclopentadienyl)titanium dimethyl were dissolved in 100 parts of a purified anhydrous toluene. After cooling the solution to −80° C., 9.5 parts of titanium tetrachloride were added as a 1.0 molar solution in pentane with agitation. The mixture was then warmed to 0° C. and agitated at that temperature for 4 hours. The volatile components were then removed by distillation under high vacuum at −10° C. The excess titanium tetrachloride and solvent were then removed from this distillate by fractionally distilling at −36° C. under high vacuum. The methyltitanium trichloride in the residue was dissolved by means of pentane. Analysis of an aliquot of this solution showed it to contain 0.52 millimole of titanium per gram and 1.60 millimoles of chlorine per gram or a 3.1 ratio of chlorine to titanium; theoretical value is 3.

PREPARATION OF DIMETHYLTITANIUM DICHLORIDE

A solution of 5.6 parts of methyltitanium trichloride in pentane was added to a solution of 5.7 parts of bis(cyclopentadienyl)titanium dimethyl in pentane at −40° C. The reaction mixture was allowed to warm to 0° C. and was agitated at that temperature for about 16 hours. It was then fractionally distilled at 0.2 mm. Hg. A first fraction taken at −36° C. to 0° C. was essentially solvent. The second fraction collected at 0° C. to 25° C. consisted of blackish-purple crystals. These were dissolved and recrystallized twice from n-heptane. On analysis they were found to have a chlorine to titanium ratio of 2.0 (theory is 2.0).

Examples 1–9

In each of these examples ethylene was polymerized by passing the gas at a given pressure into a solution of the alkyl-titanium halide used as the catalyst in 35 parts of n-heptane except in the case of Example 8 where 45 parts of benzene was used, and in Example 9 where 175 parts of n-heptane was used. The alkyltitanium halide used as the catalyst in each example and the amount thereof expressed as millimoles per liter of reaction mixture are given in the following table along with the temperature at which the polymerization was carried out, the ethylene pressure and any other variables. In Example 7 a mixture of methyltitanium trichloride and dimethyltitanium dichloride was used as the catalyst. In Example 9 the catalyst was added continuously over a period of 1.5 hours instead of all at the beginning of the reaction as was the case in Examples 1–8. At the end of the polymerization the polymer was separated in each case by filtration, washed with a methanolic solution of hydrogen chloride, then with pure methanol and dried. The RSV of each of the polyethylenes produced along with their melting points in many cases is also set forth in the table. To demonstrate the efficiency of the catalyst, the number of polymer molecules produced per titanium added was determined in Examples 1 and 2 and found to be 8.2 and 12.5, respectively.

TABLE

| Ex. No. | Alkyl-Titanium Halide | Amount, mm./l. | Reaction Temp., °C | Ethylene Pressure, p.s.i.g. | Other Variable | Polymer RSV | Polymer Melting Point, °C |
|---|---|---|---|---|---|---|---|
| 1 | $CH_3TiCl_3$ | 5 | 60 | 40 | | 0.8 | 135 |
| 2 | $CH_3TiCl_3$ | 5 | 60 | 20 | | 0.5 | |
| 3 | $C_2H_5TiCl_3$ | 10 | 30 | 45 | | 0.9 | |
| 4 | $(i-C_4H_9)TiCl_3$ | 7.1 | 30 | 45 | | 20.8 | 139 |
| 5 | $(CH_3)_2TiCl_2$ | 1.7 | 30 | 45 | | 24.4 | 138 |
| 6 | $(CH_3)_2TiCl_2$ | 1.7 | 0 | 45 | | 32.2 | |
| 7 | $\{(CH_3)_2TiCl_2 \atop CH_3TiCl_3\}$ | 2.0 / 2.5 | 30 | 40 | | 2.1 | |
| 8 | $CH_3TiCl_3$ | 4.8 | 60 | 40 | Benzene as diluent | 0.9 | |
| 9 | $CH_3TiCl_3$ | 74 | 60 | 0 | Catalyst added continuously. | 0.6 | 134 |

What we claim and desire to protect by Letters Patent is:

1. The process of polymerizing ethylene which comprises contacting ethylene with a catalyst consisting essentially of at least one alkyltitanium halide selected from the group consisting of isobutyltitanium trichloride and dimethyltitanium dichloride.

2. The process of claim 1 wherein the alkyltitanium halide is isobutyltitanium trichloride and the polymerization is carried out at a temperature of from about 30° C. to about 60° C.

3. The process of claim 1 wherein the alkyltitanium halide is dimethyltitanium dichloride and the polymerization is carried out at a temperature of from about 0° C. to about 30° C.

References Cited in the file of this patent

UNITED STATES PATENTS 2,905,645    Anderson et al. _____ Sept. 22, 1959

FOREIGN PATENTS 540,459    Belgium _____ Aug. 31, 1955
533,362    Belgium _____ Nov. 16, 1955
538,782    Belgium _____ Dec. 6, 1955

OTHER REFERENCES

Nenitzescu: Angewandte Chemie, vol. 68, July 7, 1956, p. 438.

Ziegler: Angewandte Chemie, vol. 68, September 7, 1956, p. 581.

Welch et al.: Abstracts of Papers Presented at the 130th Meeting of the American Chemical Society, Atlantic City, New Jersey, September 16–21, 1956, pp. 13S–14S.

Gaylord and Mark: Linear and Stereoregular Polymers, Interscience Publishers Inc., N.Y., N.Y. (1959), pp. 168–174.